United States Patent [19]

Das et al.

[11] 3,783,678

[45] Jan. 8, 1974

[54] VACUUM GAUGE CALIBRATOR

[75] Inventors: Khandelwal B. Das, Seattle; William E. Strobelt, Auburn, both of Wash.

[73] Assignee: The Boeing Company, Seattle, Wash.

[22] Filed: Oct. 13, 1971

[21] Appl. No.: 188,903

[52] U.S. Cl. ................................................ 73/4 V
[51] Int. Cl. ............................................. G01l 27/02
[58] Field of Search ............................. 73/4 V; 1/23

[56] References Cited
UNITED STATES PATENTS

| | | | |
|---|---|---|---|
| 3,395,565 | 8/1968 | Brock et al. | 73/4 V |
| 3,427,858 | 2/1969 | Morrison | 73/4 V |
| 3,426,579 | 2/1969 | Lebel et al. | 73/23 |

OTHER PUBLICATIONS

Publ. "Calibrating Vac. Gages Below $10^9$ Torr" – by Research/Development, December 1963 (pp. 58–60).

Primary Examiner—Richard C. Queisser
Assistant Examiner—Daniel M. Yasich
Attorney—T. H. Murray et al.

[57] ABSTRACT

A vacuum gauge calibrator characterized by a vacuum chamber having an outlet for an ionization gauge to be calibrated in combination with a vacuum chamber and associated vacuum pump, which pump includes a liquid nitrogen trap to liquefy any foreign gas heavier than nitrogen, a hydrogen analyzer, a heated palladium disc permeable to hydrogen and an electrolysis cell for generating a precisely known amount of hydrogen, whereby hydrogen generated by the cell is caused to seep through the disc and to be collected in the vacuum chamber where the ionization gauge is then calibrated.

4 Claims, 3 Drawing Figures

VACUUM GAUGE CALIBRATOR

BACKGROUND OF THE INVENTION

This invention relates to apparatus for the analysis of a fluid or gas, and more particularly, it pertains to apparatus for the calibration of an ionization gauge for use in conjunction with the detection and quantitative measurement of the concentrations of hydrogen or any other gas present in a mixture of other gases.

DESCRIPTION OF THE PRIOR ART

At present, the detection of hydrogen in parts per billion in gas mixtures is attempted by using such instruments as monopole, quadruple, or sector-type residual gas analyzers. These instruments require a high vacuum and their operation is time consuming and costly. For example, calibration of high vacuum ionization gauges or residual gas analyzers on an absolute basis requires extremely high vacuum systems. A knowledge of absolute flow of hydrogen into the vacuum system is a necessary criteria for calibration. However, known methods for that purpose are generally costly and inaccurate. The use of hydrogen as calibrating gas is attempted only when it is absolutely necessary because of its well-known hazards. Spectrographic and ultra-high sensitive mass spectrometers can detect hydrogen at this level but involve extremely complicated experimental procedure. Moreover, the implementation of such expensive systems on a production line is neither practical nor economical.

Calibration of ionization gauges is frequently desirable for hydrogen gas. Presently, such calibrations are either not attempted because of the industrial hazard of highly combustible hydrogen or are performed by using commercially available conductance limited dynamic vacuum calibration systems which are expensive. Briefly, the detection and calibration processes are two different procedures and with existing instruments have been uneconomical to use.

U.S. Pat. No. 3,426,579, issued to S.J. Lebel et al. and entitled "Continuous Monitor for the Rapid Detection of Hydrogen and Oxygen," discloses apparatus for the qualitative and quantitative analysis of hydrogen or oxygen present in a gas mixture. The gas mixture is impinged upon a heated palladium barrier in a chamber which has been activated by hydrogen produced by an electrolytic cell. The other side of the chamber is continuously pumped by an ion pump. The hydrogen permeating the barrier creates a pressure change which is detected by a change in current supplied to the ion pump and a detector unit. An oxygen scrubber may be placed between the barrier and the gas source to remove oxygen from the gas mixture. A disadvantage of the apparatus of that patent is that the system is designed only for detecting hydrogen and not for measuring gas input flow-rates and pumping speed which are essential parameters for calibration of high vacuum gauges.

SUMMARY OF THE INVENTION

It has been found in accordance with this invention that the foregoing disadvantages may be overcome by providing in conjunction with a gas analyzer of the type disclosed in said U.S. Pat. No. 3,426,579, a conductance limited pumping station which as a combination provides an ultrasensitive hydrogen detector and a high vacuum gauge calibration system.

The vacuum gauge calibrator of the invention comprises means defining a chamber, and means specific for the permeation of hydrogen, preferably a metallic disc, dividing the chamber into inlet and outlet parts. A vacuum chamber is connected to the outlet part of the first-mentioned chamber; while means including an orifice plate connect the vacuum chamber to a conductance limited oil diffusion pump. An ionization gauge to be calibrated is connected to the vacuum chamber so as to be responsive to pressures therein; while electrolytic cell means for generating a known amount of hydrogen is connected through a conduit to the inlet part of the first-mentioned chamber.

Hydrogen analyzing means such as that shown and described in U.S. Pat. No. 3,426,579 is connected to the aforesaid conduit means for determining the total flow rate of hydrogen from the electrolytic cell means and the flow rate of hydrogen passing through the disc which is permeable to hydrogen. The flow rate of hydrogen passing through the permeable disc can be determined by first disconnecting the chamber containing the permeable disc from the electrolytic cell and measuring with the hydrogen analyzing means the total flow rate from the cell. Thereafter, the electrolytic cell is connected to the chamber containing the hydrogen-permeable disc and the excess flow which does not pass through the disc caused to flow through the hydrogen analyzing means whereby the flow rate through the disc can be determined by subtracting the total flow rate from the excess flow rate.

True or actual pressure in the vacuum chamber can then be derived from the ratio of the flow rate of hydrogen passing into the vacuum chamber to the conductance of the orifice plate at the outlet of the vacuum chamber. "Conductance" is the amount or volume of gas passing through the orifice plate per unit of time. The derived true pressure is then compared against ionization gauge readings to derive a correction factor.

The advantage of the vacuum gauge calibrator of this invention is its dual capability for detecting hydrogen and providing an absolute calibration standard for high vacuum ionization gauges and residual gas analyzers on an absolute basis and at a minimal cost compared to conventional instruments.

DESCRIPTION OF THE PREFERRED EMBODIMENTS

Figure 1:
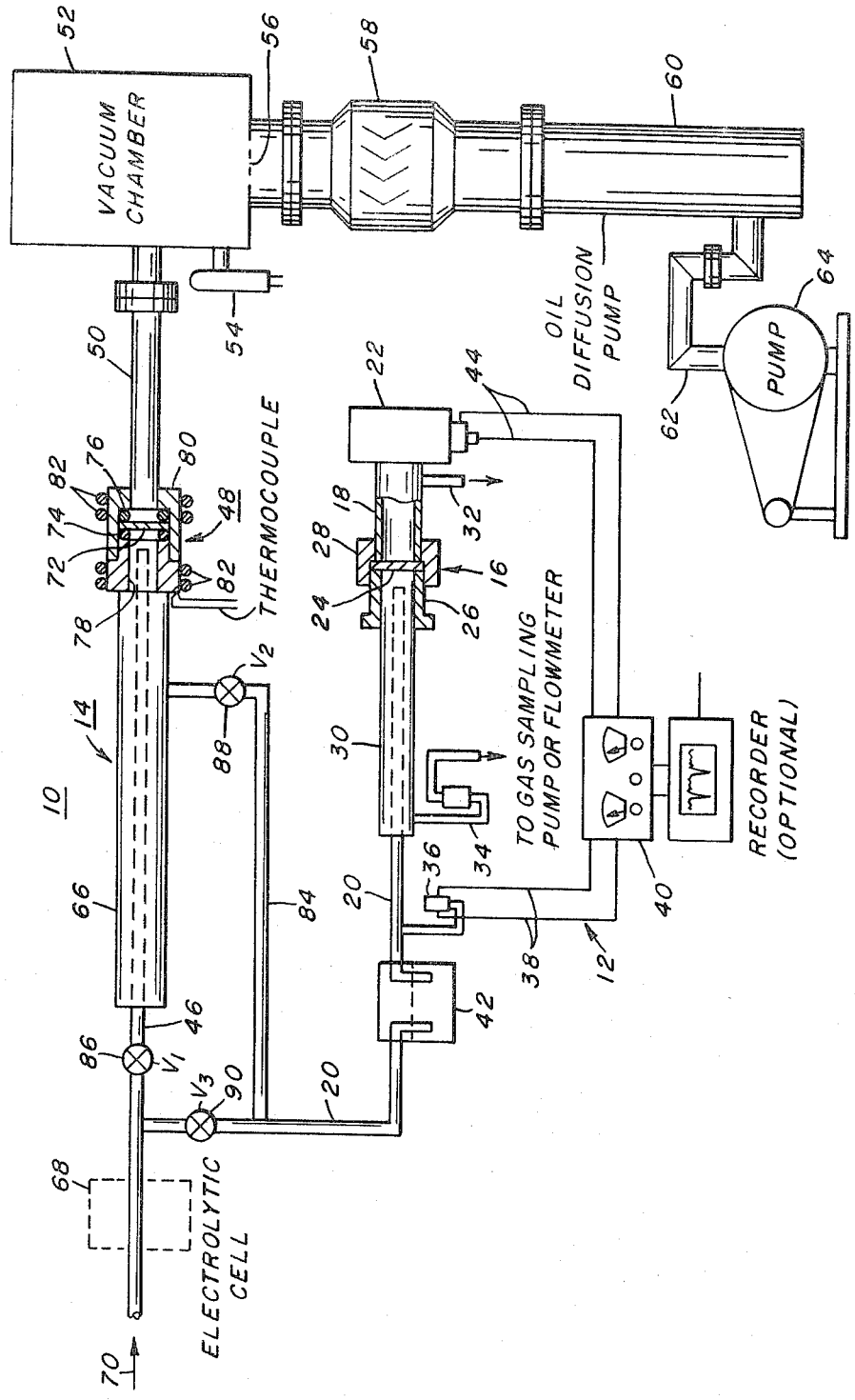
FIG. 1 is a schematic view of the vacuum gauge calibrator of the present invention.

As shown in FIG. 1, the calibrator is generally indicated at 10 and includes a hydrogen analyzer generally indicated at 12, and a hydrogen detection assembly generally indicated at 14. The hydrogen analyzer 12, being substantially similar to that disclosed in U.S. Pat. No. 3,426,579 comprises an electrically heated diffusion barrier unit 16 interconnected with a low pressure chamber 18, a conduit 20, and a combination ion pump and detector unit 22. The conduit 20 conveys gas to be analyzed for hydrogen from a source to be described hereinbelow to the unit 16, which unit includes a diffusion barrier 24 which is clamped between cylindrical fittings 26 and 28. The unit 16 also includes a chamber 30 on the side of the barrier 24 opposite that of the low pressure chamber 18. Pressure within the low pressure chamber 18 is reduced by a rotary vane pump and/or a heated liquid diffusion pump (not shown) which evacuates the chamber through conduit 32. When the desired low pressure has been achieved, the conduit is sealed off by suitable means such as a valve (not shown). Subsequent pumping of the chamber is continuously maintained by the ion pump and detector unit 22. A gas sample pump (not shown) pumps gas or fluid away from the chamber 30 through a conduit 34.

The diffusion barrier unit 16 includes a heater wire (not shown) for the barrier 24 disposed in the form of coils about a portion of the unit. The diffusion barrier 24 is specific for hydrogen only, is a thin disc or filament having a thickness of say, about 0.005 inch, and is composed of a material that is permeable only to hydrogen when heated. Such materials include palladium, palladium alloys such as palladium-silver and palladium-gold, mild steel, nickel or manganese alloy foil.

An activation cell 36 forms hydrogen by electrolytic decomposition of an aqueous solution of sulfuric acid, for example. In this manner, the surface of the barrier 24 is activated for fast response time and high sensitivity for the detection of hydrogen. Also the cell 36 communicates with the gas sampling conduit 20 and, by electrical leads 38, it is connected to a control unit and read-out center 40 which serves, in part, to monitor a partial pressure of the activation gas within the cell 36 in terms of amperage and to thereby provide an accurate accounting of the presense of hydrogen coming from the cell as distinguished from the amount of hydrogen present in the gas from the source to which the conduit 20 is connected.

The control unit and read-out center 40 is formed in part by any of the commercial meters available, for example, an ammeter. The center 40 interpolates (by appropriate known indicators not shown) the readings in terms of partial pressure of hydrogen.

An additional problem may exist in the detection analysis of a gas or fluid for the presence of hydrogen where oxygen is present and particularly where the oxygen concentration is greater than one-half a percent (by volume percent) of hydrogen concentration. For that reason, the gas is preferably conducted by first passing the gas or fluid through an oxygen trap of scrubber solution 42.

Within the ion pump and detector chamber 22 any increase in pressure due to hydrogen which diffuses across the barrier 24 is immediately detected by the combination pump and detector unit in terms of the partial pressure within the chamber 18. The unit 22 is connected by electric leads 44 to the control unit and read-out center 40 which interpolates the current readings in terms of partial pressure of hydrogen.

The vacuum detector 14 includes an inlet conduit 46, a barrier unit 48, a low pressure chamber 50, a vacuum chamber 52, an ionization gauge 54, a calibrated orifice plate 56, a liquid nitrogen trap 58, an oil diffusion pump 60, and a conduit 62 leading to a vacuum pump 64.

In addition, the vacuum detector 14 includes a chamber 66 and an electrolytic cell 68. An arrow 70 at the left end of the conduit 46 (FIG. 1) indicates a source of argon gas used as a carrier gas when the system is used in conjunction with the electrolytic cell 68 for calibration or for analyzing a sample of test gas.

The barrier unit 48 being similar to the unit 16 includes a disc, diaphragm, or foil 72 which is clamped between a pair of O-rings 74 and 76 and which divides the chamber formed by unit 48 into inlet and outlet parts. The rings are retained in place by fittings 78 and 80 which are secured together in a suitable manner such as by threaded engagement. Suitable heating elements such as nickel-chrome heater wires 82 are disposed around the fittings and the disc 72. The disc is composed of a metal which, when heated to a suitable temperature such as 800° F is permeable to hydrogen. The disc is preferably composed of palladium.

The vacuum detector 14 is assembled to enable calibration of high vacuum gauges. The palladium disc 72 has a conductance limited, liquid nitrogen trapped, oil diffusion pumped high vacuum system on one side and an electrolytic cell and a carrier gas supply assembly on the other side. The high vacuum chamber includes an ionization gauge 54 which measures the total pressure in the chamber. The calibrated orifice plate 56 regulates the rate of pumping and has dimensions that are such that the net pumping speed of the unit is defined by the theoretical conductance of the orifice in the molecular flow range (i.e., below a pressure of $1 \times 10^{-4}$ torr). The oil diffusion pump 60 does not pump like the ion pump. Ion pumps have a tendency to become saturated with gases like hydrogen, helium, and argon when subjected to a heavy gas load or with prolonged operation under such atmospheres and have different pumping speeds for different gases. The conductance limited pump 60 does not suffer from these disadvantages and has a unique advantage of operating at a relatively constant pumping speed and is substantially independent of the fluctuation in the pumping speed of the pump backing the orifice plate. In the present configuration, the net pumping speed of the system is given by the following relationship:

$$1/S_{net} = 1/C + 1/S_p$$

where
 $S_{net}$ = net pumping speed of the system (lit./sec.);
 $C$ = conductance of the orifice plate (lit./sec.); and
 $S_p$ = pumping speed of the pump backing the orifice plate (lit./sec.).

For example, when $C = 2$ lit./sec. and $S_p = 5,000$ lit./sec., then $S_{net}$ is 1.9992 lit./sec. If, $S_p$ decreases for some reason to a drastically low value of 500 lit./sec. (a reduction of 90 percent), the $S_{net}$ is still 1.992 lit./sec. With the presently available instrumentation, pumping speeds cannot be estimated better than three significant figures. Thus the pumping speed for all practical purposes remains constant for such conductance limited systems.

Moreover, a constant pumping speed is a fundamental requirement for defining true pressure in a vacuum system provided the gas input flow rate "Q" (torr-lit./sec.) is known. If $Q$ and $S_{net}$ are known, then the true pressure in the system is defined by the relation $P_{true}$ (torr or mm. of Hg) $= Q/S_{net}$ (torr-lit./sec.)/lit./sec..

The function of the electrolytic cell 68 is to supply precise amounts of hydrogen in quantities as small as a few parts per million. According to Faraday's law, in the process of electrolytic changes equal quantities of electricity charge or discharge equivalent quantities of ions at each electrode in an electrolytic cell. One gram equivalent weight of matter is chemically altered at each electrode for 96,501 int. coulombs, or when one Faraday of electricity passes through the electrolyte. The electrolyte used is a saturated solution of potassium sulphate ($K_2SO_4$) having low volatility and chemical neutrality in the present reaction. Upon electrolysis, water decomposes into oxygen and hydrogen.

In accordance with Faraday's law, 96,501 int. coulombs are required to transfer 1 gram equivalent of $H_2$ at standard temperature and pressure. In the reaction given above, $4 \times 96,501$ coulombs (amp. - sec.) are required to gige 2 gram mols of hydrogen. Since 2 gram mols occupy 22,400 cc at STP, by using a simple proportion, it can be shown that about 0.1275 cc of hydrogen is generated per direct current ampere-second input at the cathode of the cell.

The generated hydrogen is mixed with a pure carrier gas such as pure argon and directed toward the palladium disc 72. About 80 cc/min. of the carrier gas flow is satisfactory. The temperature of the palladium disc 72 is maintained at about 800°F for adequate permeation of hydrogen through the disc 72 giving rise to a proportional increase in the ionization gauge 54 on the vacuum chamber 52. By increasing the current in the electrolytic cell 68 in suitable increments, known amounts of hydrogen can be introduced into the vacuum system. The true pressure in the system is calculated by taking the ratio of the flow rate of gas input to the conductance of the orifice plate 56. The true pressure is then compared with the ion-gauge readings and a correction factor is determined. This procedure assures the calibration of the ionization gauge 54 for hydrogen gas and is absolute because the dimensional measurements of the orifice plate 56 and the current meter measurements are both traceable to the National Bureau of Standards.

Once the ionization gauge 54 is calibrated, the system becomes a direct reading hydrogen detection device. It is possible to detect as little as 10 parts per billion of hydrogen with the vacuum detector 14. For hydrogen from an unknown source such as traces of hydrogen in a gas cylinder or some other unknown gas mixture, the unknown sample is mixed with carrier gas in place of the hydrogen from the electrolytic cell 68. Since the palladium disc 72 permeates only hydrogen, any traces of hydrogen present in the sample gas will permeate through the disc giving a direct reading in parts per million or parts per billion of hydrogen as directly read by the ion-gauge reading.

Figure 2:
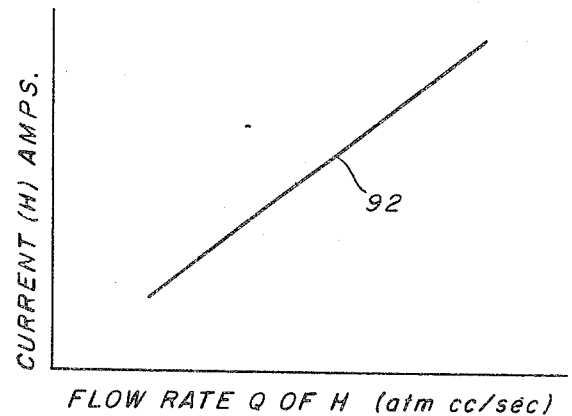
FIG. 2 is a graph showing the current in amperes of a vac-ion pump plotted against the flow rate of hydrogen (atm. cc/;sec.)

The calibrator 10 also includes a conduit 84 extending from the chamber 66 to the conduit 20. A valve 86 is disposed in the conduit 46 between the electrolytic cell 68 and the chamber 66. A second valve 88 is disposed in the conduit 84. A third valve 90 is disposed in the conduit 20 between the conduit 46 and the oxygen trap 42. In operation, the valves 86 and 88 are closed with the valve 90 open to calibrate the hydrogen analyzer 12. With incremental increases of current in the electrolytic cell 68, the relationship between the ion-pump current readings and the flow rate of hydrogen is plotted and shown in the curve 92 of FIG. 2. From the relation $Q_1 = KI_t$, the proportionality factor $K$ is evaluated.

The valves 86 and 88 are then opened and the valve 90 is closed so that a mixture of argon and hydrogen flows directly toward the disc 72 leading to the vacuum system including the chamber 52 and the ionization gauge 54. From the calibration curve 92 of FIG. 2, the flow of hydrogen through the analyzer 12 with valve 90 closed and valves 86 and 88 open is determined. This flow value, derived with hydrogen passing through the disc 72 is then subtracted from the total flow input previously determined with valves 86 and 88 closed and valve 90 open in order to determine the flow rate of hydrogen through the disc 72 and into the vacuum system. The ratio of the input flow rate into the vacuum system to the conductance of the orifice plate 56 is then used to estimate the true pressue of hydrogen in the vacuum system. Readings are taken from gauge 54; and these readings are compared against the computed true pressure (i.e., the ratio of the input flow rate into the vacuum system to the conductance of the orifice plate 56) to establish a correction factor.

Figure 3:
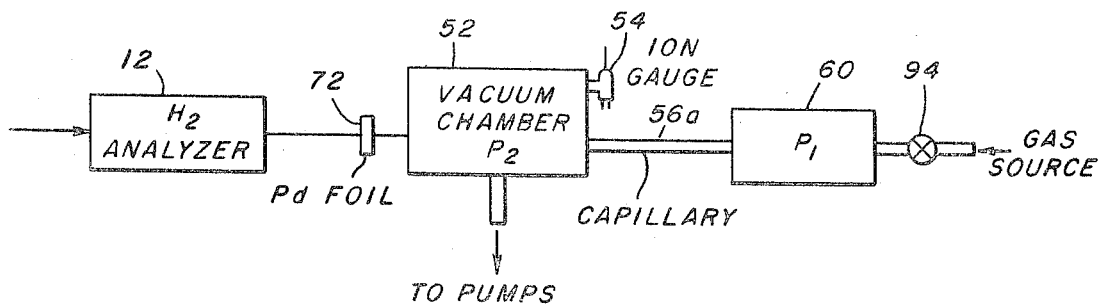
FIG. 3 is a schematic view of a calibrator for an ion gauge for gases other than hydrogen.

Although the foregoing system is used effectively only for hydrogen, suitable design modifications may be made to detect or calibrate for other gases. To calibrate the ionization gauge 54 for any other gas, a slightly different unit is required. After calibrating the ionization gauge 54 with hydrogen gas by using the hydrogen analyzer 12, the analyzer is valved off. Hydrogen is then introduced into the vacuum chamber by carefully manipulating a variable leak valve 94 (FIG. 3) until a desired reading is registered by the ionization gauge 54. The gauge reading gives the corresponding gas input rate (from the calibration curve 92) for the given opening of the valve 94. With the same setting of the valve 94, a different gas is introduced and the reading of the ionization gauge 54 is recorded. With this data, the true pressure is calculated as follows for any other gas such as nitrogen. When the pressure $P_1 >> P_2$ and $P_1$ is approximately 1 atm.

$(Q)_{H_2} = \pi a^4/8 \eta_{H_2} L \; [P_1 + P_2/2] \times (P_1 - P_2) = (\pi a^4/8 \eta_{H_2} L) (P_1^2)_{H_2}/2)$ Likewise $(Q)_{N_2} = [\pi a^4/8 \eta_{N_2} L] ((P_1^2)_{N_2}/2)$ where:

$a$ = radius of capillary;
$L$ = length of capillary; and
$\eta$ = coeff. of viscosity of gas. If $(P_1^2)_{N_2} = (P_1^2)_{H_2}$, then $(Q)_{N_2} = (\eta_{H_2}/\eta_{N_2}) (Q)_{H_2}$ \hfill (1)

This shows that equation (1) is independent of the dimensions of the capillary.

True Pressure $= Q_{N_2}/C$ where $C$ = conductance of orifice on the vacuum chamber for $N_2$ gas.

When $P_1 < 1 \times 10^{-4}$ torr, and $P_1$ is much larger than $P_2$, for a cylindrical capillary of radius "$a$" and length "$L$"

$(Q)_{H_2} = 30.48 \; a^3/L \; [(T)/M_{H_2}]^{1/2} [P_1 - P_2] = 30.48 \; a^3/L \; [(T)/M_{H_2}]^{1/2} (P_1)_{H_2}$ $(Q)_{N_2} = 30.48 \; a^3/L \; [(T)/M_{N_2}]^{1/2} (P_1)_{N_2})$ where $T$ = temperature of gas
or $(Q)_{N_2} = [M_{H_2}/M_{N_2}]^{1/2} [(P_1)_{N_2}/(P_1)_{H_2}](Q)_{H_2}$ Briefly, $Q$ is independent of the dimensions of the capillary but depends only on the molecular weight of the gas.

$P_{true} = (Q)_{N_2}/(C)_{N_2}$ where $C$ = conductance of the orifice on the vacuum chamber in liters/second. Finally, from the relation $P_{true} = K'P_{indicated}$ the correction factor $K'$ *for the gauge is determined.*

Accordingly, the novel features of the calibrator 10 include its dual capability for detecting hydrogen gas and for providing absolute calibration for ionization gauges traceable to the National Bureau of Standards. The calibrator is relatively inexpensive in construction and immediate in response. It is portable and can be incorporated in a production line for continuous operation if desired.

In the calibrator 10, the hydrogen detector 12 is employed as a flow meter device. By adding a conductance limited pumping system in conjunction with the flow meter, the system becomes a gauge calibrator. Calibration is direct and the system is independent of such variables as fluctation in room temperature and pressure in the gas inlet system and the calibration is absolute.

Although the invention has been shown in connection with certain specific embodiments, it will be readily apparent to those skilled in the art that various changes in form and arrangement of parts may be made to suit requirements without departing from the spirit and scope of the invention.

We claim as our invention:

1. A vacuum gauge calibrator comprising means defining a diffusion barrier unit, means specific for the permeation of hydrogen dividing said unit into inlet and outlet parts, a vacuum chamber connected to said outlet part of the barrier unit, oil diffusion pump means for evacuating said vacuum chamber, means including an orifice plate connecting said vacuum chamber to said oul diffusion pump means, an ionization gauge to be calibrated connected to said vacuum chamber so as to be responsive to pressures therein, electrolytic cell means for geerating a known amount of hydrogen, hydrogen analyzing means, means for connecting said hydrogen analyzing means exclusively to said electrolytic cell means under a first set of conditions whereby the total flow rate of hydrogen from the electrolytic cell means can be determined, and means for thereafter connecting the electrolytic cell means to both said hydrogen analyzing means and said input part of the diffusion barrier unit under a second set of conditions whereby subtraction of the flow of hydrogen through the analyzing means under the second set of conditions from that through the analyzer under the first set of conditions will establish the flow rate of hydrogen into the vacuum chamber through said means specific for the permeation of hydrogen, the arrangement being such that the actual pressure in the vacuum chamber can be derived from the ratio of the flow rate of hydrogen passing into the vacuum chamber as determined by said subtraction to the conductance of said orifice plate, and derived actual pressure thereafter compared against ionization gauge readings to derive a correction factor for the ionization gauge readings.

2. The vacuum gauge calibrator of claim 1 including a first conduit connecting said electrolytic cell means to said input part of the diffusion barrier unit, a second conduit connecting said electrolytic cell means to said hydrogen analyzing means, and a third conduit connecting said input part of said diffusion barrier unit to said hydrogen analyzing means.

3. The vacuum gauge calibrator of claim 2 including a first valve in said first conduit, a second valve in said second conduit, and a third valve in said third conduit, said first and third valves being closed and said second valve being open under said first set of conditions and said second valve being closed and said first and third valves being open during said second set of conditions.

4. The vacuum gauge calibrator of claim 1 wherein said hydrogen analyzing means includes a second diffusion barrier unit having means specific to the permeation of hydrogen therethrough.

* * * * *